United States Patent [19]

Heinemann

[11] Patent Number: 4,616,529

[45] Date of Patent: Oct. 14, 1986

[54] STRAIN-WAVE TRANSMISSION WITH TUBULAR STRAIN WHEEL

[75] Inventor: Fritz Heinemann, Friedrichshafen, Fed. Rep. of Germany

[73] Assignee: ZF-Herion Systemtechnik GmbH, Friedrichshafen, Fed. Rep. of Germany

[21] Appl. No.: 589,102

[22] PCT Filed: Jun. 9, 1983

[86] PCT No.: PCT/EP83/00148

§ 371 Date: Feb. 13, 1984

§ 102(e) Date: Feb. 13, 1984

[87] PCT Pub. No.: WO83/04429

PCT Pub. Date: Dec. 22, 1983

[30] Foreign Application Priority Data

Jun. 11, 1982 [DE] Fed. Rep. of Germany ....... 3222117

[51] Int. Cl.$^4$ ............................................. F16H 37/02
[52] U.S. Cl. ........................................ 74/640; 74/764; 74/805; 74/789
[58] Field of Search ............... 74/640, 764, 789, 804, 74/805

[56] References Cited

U.S. PATENT DOCUMENTS

| | | |
|---|---|---|
| 3,077,792 | 2/1963 | Kinderman ........................ 74/640 |
| 3,101,009 | 8/1963 | Musser ............................... 74/640 |
| 3,119,283 | 1/1964 | Bentov ............................... 74/640 |
| 3,187,605 | 6/1965 | Stiff .................................... 74/640 |
| 3,196,713 | 7/1965 | Robinson ........................... 74/640 |
| 3,407,902 | 10/1968 | Musser .......................... 74/640 X |
| 3,427,898 | 2/1969 | Mayer ................................ 74/640 |
| 3,523,488 | 8/1970 | Robinson ....................... 74/640 X |
| 4,003,272 | 1/1977 | Volkov et al. ..................... 74/640 |
| 4,072,067 | 2/1978 | Benthake ........................... 74/789 |
| 4,096,766 | 6/1978 | Pardo et al. ....................... 74/640 |
| 4,425,822 | 1/1984 | Marschner et al. ............... 74/640 |

FOREIGN PATENT DOCUMENTS

| | | |
|---|---|---|
| 233973 | 6/1964 | Fed. Rep. of Germany ........ 74/640 |
| 1173759 | 7/1964 | Fed. Rep. of Germany . |
| 2468797 | 5/1981 | France . |
| 485260 | 12/1975 | U.S.S.R. ............................... 74/640 |
| 746144 | 7/1980 | U.S.S.R. ............................... 74/640 |

*Primary Examiner*—Lawrence J. Staab
*Assistant Examiner*—Dwight G. Diehl
*Attorney, Agent, or Firm*—Karl F. Ross; Herbert Dubno

[57] ABSTRACT

The strain-wave transmission according to the invention is provided, for purposes of sealing between input and output parts on both sides of the strain-wave generator, with an overlying cup-shaped jacket which is stiffened from within against bulging by a likewise cup-shaped support member open toward the pressure side. For the purpose of sealing, the frontal edges of the strain wheel and of the support members are nonrotatably and sealingly interconnected and the input-side support member is flanged onto the housing cover via a tube. The elimination of a differential pressure in the frontal regions of the strain wheel enables a flexible structure of the support member and an overall lower bulging stress with a more favorable stress distribution, thus allowing the use of more readily deformable wall thicknesses and a more reliable sealing with improved life span.

5 Claims, 4 Drawing Figures

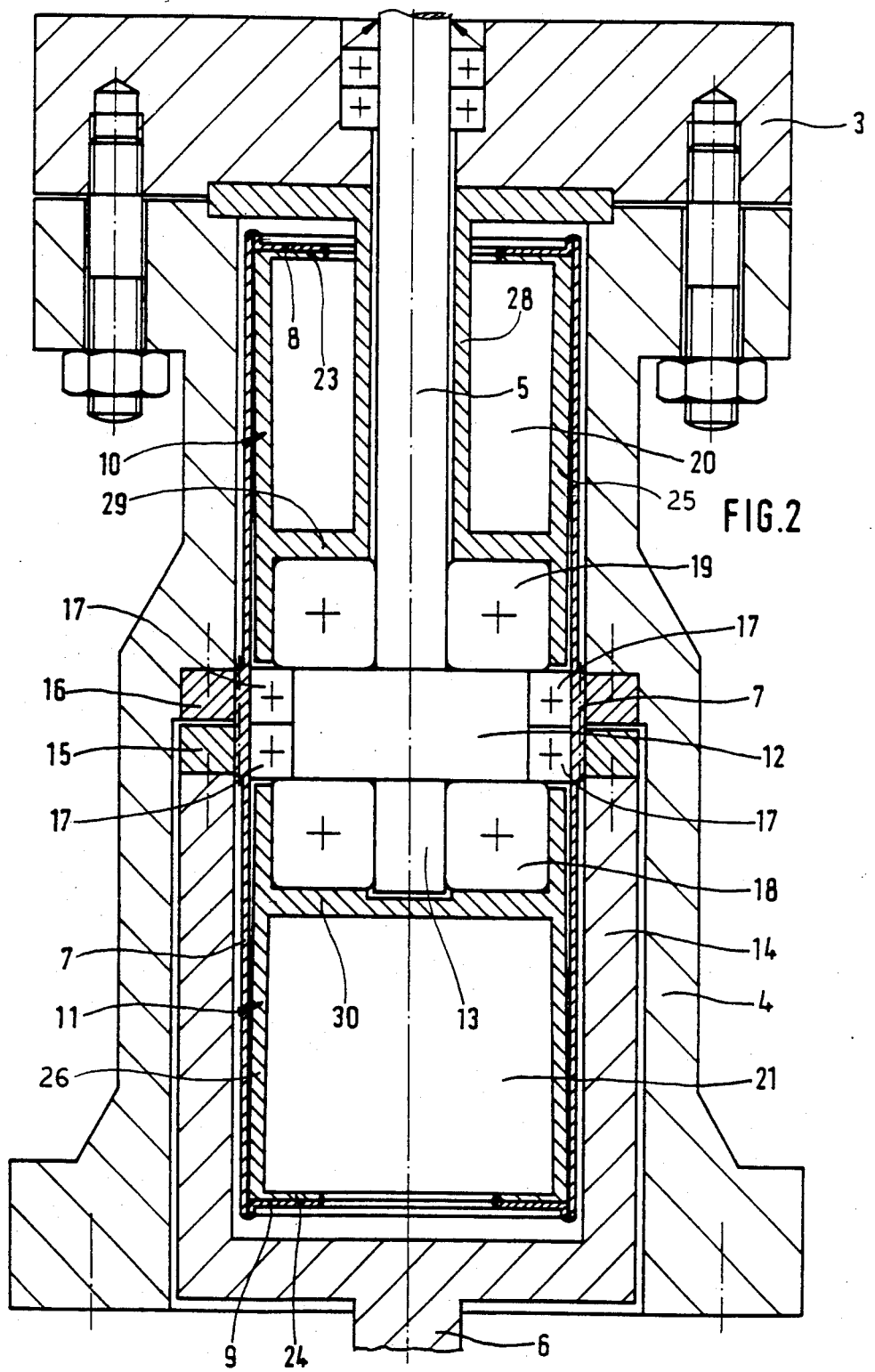

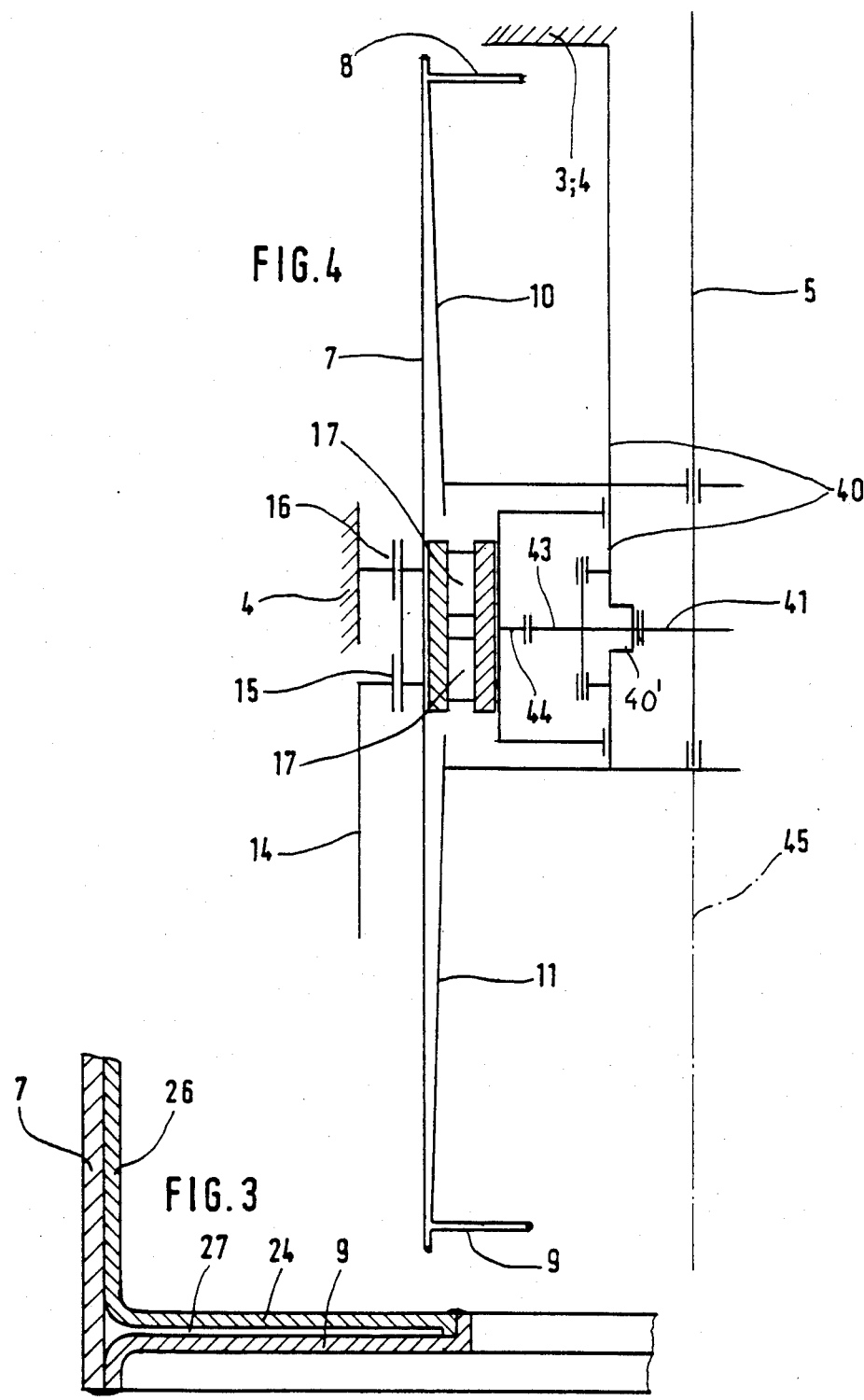

STRAIN-WAVE TRANSMISSION WITH TUBULAR STRAIN WHEEL

CROSS REFERENCE TO RELATED APPLICATIONS

This application is a national phase application corresponding to PCT/EP 83/00148 of June 9, 1983 and based in turn on the German application No. P 32 22 117.7 filed June 11, 1982.

1. Field of the Invention

My present invention relates to a strain-wave transmission which is sealable between input and output sides, in particular for a positioning drive for valve bodies, comprising a strain-wave generator, a deformable strain wheel with support members, and at least one annular gear.

2. Background of the Invention

German patent 29 44 123 shows a strain-wave transmission in which the driving and driven shafts are assigned to different pressure spaces, whose strain wheel designed as a cup-shaped case is axially clamped at one end and at its opposite end is provided with a rigid bottom. Axial forces caused by the system pressure, acting on this bottom, must be dissipated via the peripheral surface of the strain wheel, which may lead to bugging and buckling thereof. Depending on the magnitude of the applied forces, a dependable meshing of the gear teeth is no longer assured or the shell suffers a permanent deformation and thereby becomes useless. Tests have shown that the cup-shaped case cannot stand a prolonged period of operation. The useful life of a strain wheel so constructed is short. Although the forces acting laterally on the peripheral surface of the strain wheel are absorbed by support members, compressive forces acting upon the bottom of the strain wheel cannot be dissipated through the rigid support members. The differential pressure thus requires relatively thick walls in the region of the strain wheel, which additionally increases the deformation work of the strain-wave generator. Besides, the alternating tension stresses a relatively large sealing collar of the cup-shaped case and thereby impairs the sealing against the housing.

OBJECT OF THE INVENTION

The invention has the object of providing a strain-wave transmission with excellent sealability constructed to resist higher pressures than the known transmission according to the preamble and so to attain a higher life span.

SUMMARY OF THE INVENTION

According to the invention the problem is solved by the features recited in the characteristic clause of claim 1.

According to the invention the strain wave transmission has a housing sealable between input and output sides, a strain-wave generator connected with a driving shaft, a deformable cylindrical strain wheel meshing with an annular gear of a driven shaft, the end faces of the strain wheel surrounding support members whose frontal edges are tightly connected with the strain wheel. In this construction:

the support members are open on both end faces and are cup shaped, and
the bottom of the input-side support member is mounted non-rotatably and sealingly on the housing by means of a tube segment surrounding the driving shaft.

Compared to that which is known, the invention has the advantages that considerably higher system pressures than heretofore can act without detriment upon the strain-wave transmission, and that greater useful life than heretofore is attainable. Thereby the transmission becomes more versatile in use and the intervals between repairs are significantly prolonged.

The bilaterally cup-shaped, open design of the strain wheel according to the invention, and of the two support members tightly connected therewith at the frontal edge which can be relatively thin-walled in proximity to the edge by virtue of the extensive relief from the differential pressure, enables a reduction of the bulging stress, with a much more uniform stress distribution in the strain wheel and at the support members, whereby the danger of rupture from alternating stresses is considerably reduced and comparatively higher pressure loads become possible.

It is also advantageous that the connection between the support members and the housing is now no longer provided via a part of the strain wheel itself but via a considerably thinner tube, between the bottom and the cover of the housing, which is there more reliably sealable by means of a small sealing flange practically unaffected by the alternate bendings of the strain wheel.

Owing to the fact that the bottoms of the support members are now located very close to the strain-wave generator and the remaining region bilaterally absorbs the high pressure, their peripheral region highly stressed by the differential pressure is now comparatively much smaller or shorter and is therefore also much easier to deform mechanically than with the cup-shaped case of prior construction subjected over its entire length to the differential pressure.

According to a further feature of the invention there is provided at each open end of the strain wheel a respective membrane ring through which the strain wheel is connected with the respective support member. This has the result that the axial deformations additionally caused by the strain-wave generator in the cylindrical peripheral surface of the strain wheel, at the frequency of the driving speed, are also compensated. Furthermore, the axial flexibility of the membrane ring prevents axial movements of the support members, which are caused by deformations thereof under the effect of the system pressure or by the compensation of play due to manufacturing tolerances, from reaching the peripheral surface.

Another feature of the invention provides that the output-side support member is braced via a thrust bearing, the strain-wave generator, a second thrust bearing and the input-side support member. On account of the system pressure acting upon both support members, only a part of the axial forces need to be dissipated via the thrust bearings and the strain-wave generator.

According to another embodiment of the invention, the support members are connected with the housing only via a common tube with peripheral openings through which a driving connection (e.g. planetary-gear transmission, hydraulic motor, electric motor or the like) to the strain-wave generator is provided.

In a further of this embodiment the tube is designed as a planet carrier in the zone between the two support members, the strain-wave generator being driven via a sun gear and planet gears. The construction of the tube for the connection and mounting of the two support members as a planet carrier leads to a simplification of this embodiment with uncharged favorable sealing mode.

Strain-wave transmissions with planetary-gear sets are known from British Pat. No. 12 64 590 and German Pat. No. 11 82 011. Both these transmissions, however, lack features for a pressure-tight separation of the input and output sides, or suggestions for a support capable of sustaining high differential pressures for the strain wheel which is here not cup-shaped on both sides.

BRIEF DESCRIPTION OF THE DRAWING

The invention is explained for two embodiments with the aid of the accompanying drawings in which:

FIG. 2 shows a section through the transmission along a line II—II in FIG. 1;

FIG. 3 shows in enlarged representation a cutout of the sectional view of FIG. 2 with respective parts of the free end of the strain wheel, a support member and a membrane ring, and;

FIG. 4 shows schematically another embodiment with a tube for holding both support members.

SPECIFIC DESCRIPTION

Figure 1:
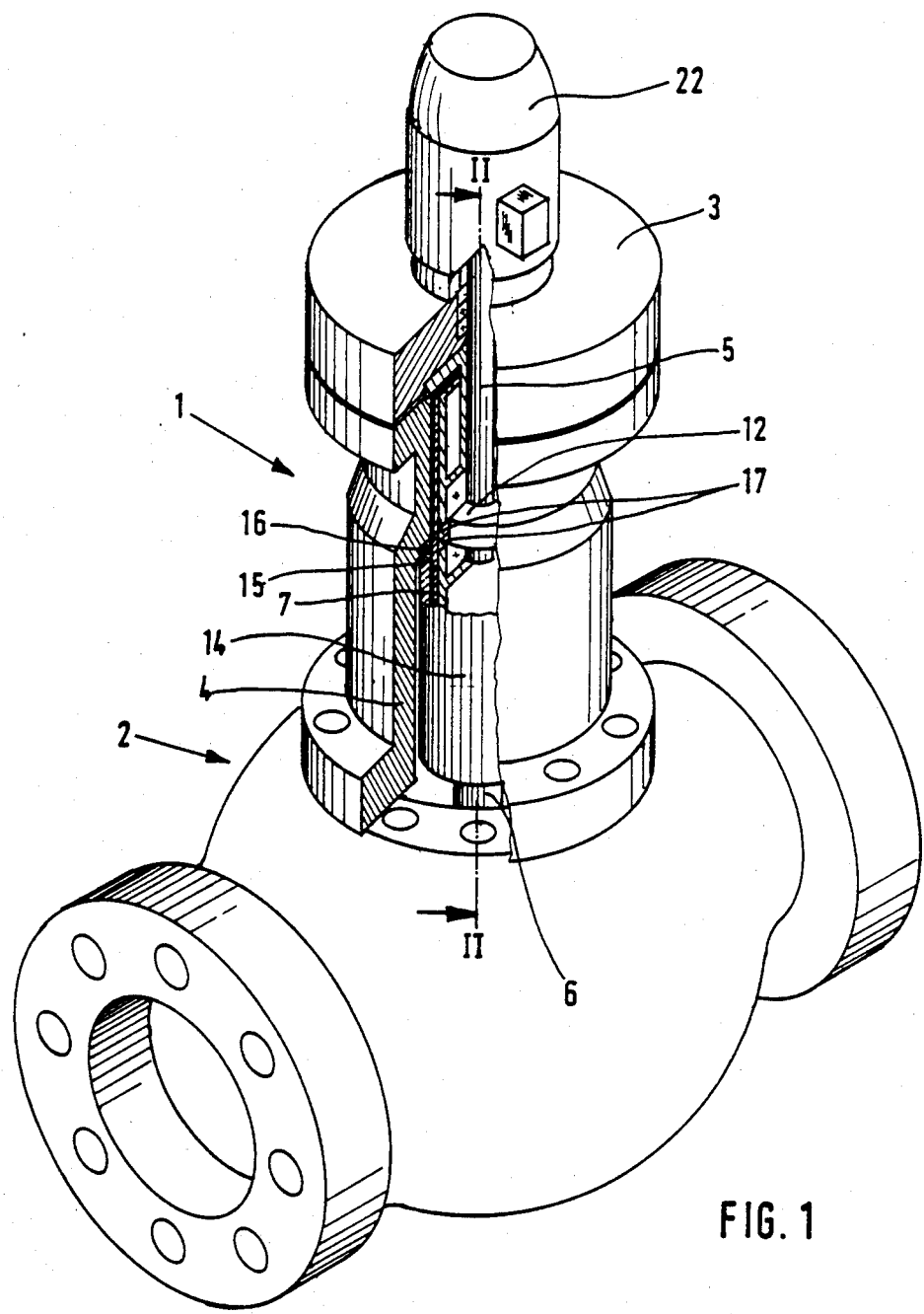
FIG. 1 shows in perspective representation, partially in section, the strain-wave transmission according to the invention with attached motor and a sliding valve body.

A valve body, e.g. a slider 2 (FIG. 1), is equipped with a positioning drive 1. The latter is located in a housing, consisting of housing parts 3, 4, and has a driving shaft 5 with which a handwheel, a handlever or the output shaft of an electric motor 22 is fixedly connected to actuate the positioning drive 1.

In the embodiment the driving shaft is supported on the one hand in the housing part 3 (FIG. 2) and on the other hand by rollers 18 and 19 each of which forms a thrust bearing. The strain-wave transmission further comprises a strain-wave generator 12, of elliptical periphery as known per se and fixedly connected with driving shaft 5. It is in turn surrounded by rollers 17 (FIGS. 1, 2) which are part of a radial bearing.

A support member 10 is fixedly clamped unilaterally in the embodiment between the housing parts 3, 4. It is formed as a hollow body with a tubular segment 28, a bottom 29 and a sustaining peripheral wall 25, and partially encloses a space 20. The other support member 11 has a bottom 30 as well as a peripheral wall 26. In its bottom 30 an end of driving shaft 5 can be rotatably journaled.

The two support members 10, 11 carry a strain wheel 7 designed as a bilaterally open hollow or sleeve. The latter is tightly connected at its respective open ends to the two support members 10, 11. On the outer surface of the strain wheel 7 there is provided a set of gear teeth 7', which in the embodiment meshes on the one hand with the internal toothing of an annular gear 16, fixedly mounted in the housing 4, and on the other hand with the internal toothing of a rotatable annular gear 15. The output of the transmission occurs by way of a hollow shaft 14 and the driven shaft 6 unitary therewith.

The strain wheel 7, carried by the two support members 10, 11, is welded at each of its open ends onto a respective membrane ring 8, 9 which in turn is welded in the region of its inner edge to a ring 23 (FIG. 2) of the support 10 and a ring 24 (FIGS. 2, 3) of the support 11, respectively. Between the cover 8 and the ring 23 and between the cover 9 and the ring 24 (FIG. 3) there is provided a respective gap 27 (FIG. 3) which increases the mobility of the strain wheel 7 on the support members 10, 11.

Thus, when the driving shaft 5 is rotated in either direction, in a manner known per se, the strain-wave generator 12 rotates with it and its elliptical outline leads to a deformation of the wall of the strain wheel 7 in the region of the radial bearing formed by the rollers 17. The bulging of the wall of the strain wheel 7 leads to a movement at the ends of the strain wheel and thereby to a modification of the width of the gap 27 (FIG. 3) between the cover 9 and the ring 24 on the one hand as well as between the cover 8 and the ring 23 on the other hand. Because of the large distances in the region of the membranelike covers 8, 9, the strain wheel is carried so-to-speak floatingly by the support members 10, 11.

Both spaces 20, 21 are under system pressure. For this reason, the peripheral wall 25 of the support member 10 and the peripheral wall 26 of the support member 11 can be made with small wall thickness since they have to transmit only the forces acting directly on the peripheral surface of the strain wheel 7.

The support member 10 fixedly clamped in housing 3, 4 is centered on the driving shaft 5. The other support member 11 bears upon the housing via a thrust bearing formed by the rollers 18, the strain-wave generator 12, a further thrust bearing formed by the rollers 19, and the tube segment 28.

Another embodiment (FIG. 4) provides that both support members 10, 11 bear upon the housing 3, 4 via a common tube 40. The tube 40 is designed in the region between the two support members 10, 11 as a planet carrier for planetary gears 43 forming the strain-wave generator with ring gear 44 driven thereby. A sun gear 41 is fixedly connected with the driving shaft 5 which is aligned with an axis of symmetry 45 and meshes with gears 43 which extend through slots 40' formed in tube 40 but do not orbit the sun gear. For reasons of simplicity of the graphic representation, FIG. 4 shows only one half of the strain-wave transmission. In this embodiment the output of the transmission occurs via the deformable ring gear 44, the rollers 17 of the radial bearing and annular gears 15, 16 as well as the hollow shaft 14.

I claim:

1. A strain-wave transmission comprising:
    a housing having an input side and an output side;
    an input shaft extending axially into said housing at said input side;
    an output shaft extending axially out of the housing at said output side;
    a tubular deformable cylindrical strain wheel received in said housing and extending generally coaxial with respect to said shafts between said sides of said housing, said strain wheel having at an intermediate location along its length, gearing respectively engaging gearing on said housing and on said output shaft;
    a strain-wave generator carried by said input shaft and disposed at said intermediate location for deforming said strain wheel to effect rotation of said output shaft at a speed different from that of said input shaft upon rotation of said input shaft;
    a first cup-shaped support extending from said input side substantially to said intermediate location within said strain wheel and an end of said support rigidly affixed to a corresponding end of said strain wheel at the input side without engagement with the housing; and a second cup-shaped support extending substantially from said intermediate locaton toward said output side of said housing and having an end at said output side rigidly affixed to an end of said strain wheel at said output side, said first support being formed with a transverse bottom remote from its end affixed to said strain wheel and a tube section connected to said bottom, said tube section coaxially surrounding said input shaft and affixed at an end of said tube section remote from said bottom to said housing, each of said supports being open in the direction of the respective end affixed to said strain wheel, said second support having a transverse bottom remote from its end affixed to said strain wheel and guided on said input shaft.

2. The strain-wave transmission defined in claim 1 wherein said strain wheel at each of said ends is formed with a respective inwardly extending membrane ring, each of said supports having at the respective end affixed to said strain wheel, an inwardly extending flange secured along an inner edge to a respective inner edge of a respective one of said rings, each flange and ring having an axial clearance between them outwardly of the respective inner edges.

3. The strain-wave transmission defined in claim 2 wherein said second cup-shaped support bears via a thrust bearing, said strain-wave generator and a further thrust bearing upon said housing, said thrust bearings engaging the respective transverse bottoms of said first and second cup-shaped supports and being braced by said intermediate location against said housing.

4. The strain-wave transmission defined in claim 2 wherein said bottoms are connected by a common tube, said generator being constituted by a pair of planet gears carried by said tube and a ring gears engaged by said planet gear.

5. The strain-wave transmission defined in claim 4 wherein a sun gear meshing with said planet gears is carried by said input shafts.

* * * * *